(12) United States Patent
Zhang et al.

(10) Patent No.: US 12,127,897 B2
(45) Date of Patent: Oct. 29, 2024

(54) WATER PUMPING DEVICE FOR WATER FLOSSER AND WATER FLOSSER

(71) Applicant: Nicefeel Medical Device Technology Co., Ltd., Shenzhen (CN)

(72) Inventors: Qing Zhang, Shenzhen (CN); Xiaowen Liu, Shenzhen (CN); Jinfeng Li, Shenzhen (CN); Xinquan Liu, Shenzhen (CN); Gang Zhou, Shenzhen (CN); Gang Wang, Shenzhen (CN)

(73) Assignee: Nicefeel Medical Device Technology Co., Ltd., Shenzhen (CN)

( * ) Notice: Subject to any disclaimer, the term of this patent is extended or adjusted under 35 U.S.C. 154(b) by 864 days.

(21) Appl. No.: 17/197,844

(22) Filed: Mar. 10, 2021

(65) Prior Publication Data

US 2022/0079708 A1 Mar. 17, 2022

(30) Foreign Application Priority Data

Sep. 16, 2020 (CN) .......................... 202010972853.7

(51) Int. Cl.
*A61C 17/02* (2006.01)
*A61C 1/00* (2006.01)
(Continued)

(52) U.S. Cl.
CPC ........ *A61C 1/0092* (2013.01); *A61C 17/0202* (2013.01); *F04B 19/04* (2013.01); *F04B 53/147* (2013.01)

(58) Field of Classification Search
CPC ..... A61C 1/0084; A61C 1/0092; A61C 17/02; A61C 17/0202; A61C 17/0205;
(Continued)

(56) References Cited

U.S. PATENT DOCUMENTS

2012/0156641 A1* 6/2012 Wada ................. A61C 17/0202
  74/25
2014/0154640 A1* 6/2014 Mok .................... A61C 1/0092
  433/89
(Continued)

FOREIGN PATENT DOCUMENTS

CN 108742910 A * 11/2018 ............. A61C 17/02
JP S5884123 A 5/1983
(Continued)

OTHER PUBLICATIONS

KR101255573B1 English Machine Translation provided by Espacenet (Year: 2013).*

(Continued)

*Primary Examiner* — Joseph D. Boecker
*Assistant Examiner* — Brian T Khong
(74) *Attorney, Agent, or Firm* — von Briesen & Roper, s.c.

(57) ABSTRACT

The present disclosure relates to a water pumping device for a water flosser, which includes a mounting base, a transmission assembly, a connecting member, and a piston. The transmission assembly includes a first transmission member. The connecting member is disposed in the mounting base in a reciprocally movable manner in a first direction. The first transmission member is rotatable about a first rotation axis perpendicular to the first direction, and in mating connection with the connecting member. The first transmission member is eccentrically disposed with respect to the first rotation axis. During a rotation of the first transmission member about the first rotation axis, the first transmission member reciprocates in the first direction, so as to drive the connecting member to reciprocate in the first direction. The reciprocation of the connecting member in the first direction can drive the piston to reciprocate in the first direction.

9 Claims, 5 Drawing Sheets

(51) Int. Cl.
*F04B 19/04* (2006.01)
*F04B 53/14* (2006.01)

(58) Field of Classification Search
CPC ............ A61C 17/0208; A61C 17/0211; A61C 17/0217; A61C 17/024; A61C 17/028; A61C 17/032; A61H 13/005
See application file for complete search history.

(56) References Cited

U.S. PATENT DOCUMENTS

2015/0182319 A1* 7/2015 Wagner ................. A61C 17/20
132/308
2017/0049530 A1* 2/2017 Cacka ................. A61H 13/005

FOREIGN PATENT DOCUMENTS

| | | | |
|---|---|---|---|
| JP | H05161663 A | 6/1993 | |
| JP | 2003265504 A | 9/2003 | |
| JP | 2004180786 A | 7/2004 | |
| JP | 2012055395 A | 3/2012 | |
| JP | 2017029367 A | 2/2017 | |
| KR | 20120069685 A | 6/2012 | |
| KR | 101255573 B1 * | 4/2013 | ......... A61C 17/0217 |

OTHER PUBLICATIONS

CN-108742910-A English Machine Translation provided by Espacenet (Year: 2018).*
South Korean Request for the Submission of an Opinion for related Application No. 10-2021-0035447; reported on Dec. 9, 2022.

* cited by examiner

WATER PUMPING DEVICE FOR WATER FLOSSER AND WATER FLOSSER

CROSS-REFERENCE TO RELATED APPLICATION

The present application claims priority to Chinese patent application No. 2020109728537, filed on Sep. 16, 2020, the entire content of which is incorporated herein by reference.

TECHNICAL FIELD

The present disclosure relates to the technical field of oral cleaning care apparatus, in particular, to a water pumping device for a water flosser and a water flosser.

BACKGROUND

Water flossers are auxiliary tools for cleaning the oral cavity. The water flosser is used for cleaning residues on teeth and in gaps between the teeth by using an impact of pulsed water. At present, the water flossers are mainly divided into countertop water flossers and portable water flossers.

The countertop water flosser is mainly used at home and generally includes a water tank, a water pumping device, and a nozzle. The water pumping device generally includes a pump cylinder, a piston capable of reciprocating in the pump cylinder, and a connecting rod in transmission connection with the piston. In a conventional water pumping device, one end of the connecting rod swings in a sector shape, and the other end of the connecting rod drives the piston to reciprocate in the pump cylinder along with the swing of a front end. The connecting rod and the piston are connected in a spherical fit, and an assembly clearance exists between the connecting rod and the position. During the reciprocation, larger collision noise will be generated. When the reciprocation of the connecting rod is started, the starting resistance is relatively large.

SUMMARY

According to various embodiments of the present disclosure, a water pumping device for a water flosser and a water flosser are provided.

A water pumping device for a water flosser includes:
a mounting base;
a transmission assembly including a first transmission member rotatably connected to the mounting base about a first rotation axis, and the first transmission member being eccentrically disposed with respect to the first rotation axis;
a connecting member disposed in the mounting base in a reciprocally movable manner in a first direction perpendicular to the first rotation axis, and in mating connection with the first transmission member to drive the connecting member to reciprocate in the first direction during a rotation of the first transmission member about the first rotation axis; and
a piston detachably connected to the connecting member to reciprocate in the first direction with the connecting member.

By providing the water pumping device as described above, the connecting member is disposed in the mounting base in a manner that the connecting member can reciprocate in the first direction. The first transmission member is rotatable about the first rotation axis perpendicular to the first direction, and is in mating connection with the connecting member. The first rotation axis is eccentrically disposed with respect to the first transmission member. Therefore, the first transmission member reciprocates in the first direction during the rotation of the first transmission member about the first rotation axis, thereby driving the connecting member to reciprocate in the first direction. The connecting member reciprocates in the first direction, so as to drive the piston to reciprocate in the first direction. In this way, compared to that the conventional connecting rod swings to drive the piston to reciprocate, the connecting member only reciprocates in the first direction and doesn't swing, and thus the collision noise can be efficiently reduced. Moreover, the connecting member does not swing, such that it is ensured that the connecting member only needs to receive the power in the first direction from the first transmission member, the resistance when the connecting member is started is smaller.

In one of the embodiments, the connecting member includes a limiting groove extending longitudinally in the first direction.

The water pumping device further includes a limiting shaft fixedly connected to the mounting base and longitudinally extending in a direction parallel to the first rotation axis. The limiting shaft extends through the limiting groove such that the connecting member reciprocates in the first direction.

In one of the embodiments, the transmission assembly further includes a second transmission member. The second transmission member is rotatable disposed in the mounting base about the first rotation axis. The first transmission member is fixedly connected to the second transmission member.

In one of the embodiments, a central axis of the limiting shaft coincides with the first rotation axis. The second transmission member is rotatably connected to the limiting shaft about the first rotation axis.

In one of the embodiments, the first transmission member is immovable with respect to the connecting member in the first direction. The first transmission member is capable of reciprocating with respect to the connecting member in a second direction perpendicular to the first rotation axis and the first direction.

In one of the embodiments, the connecting member includes a mating cavity. The first transmission member is located in the mating cavity. The first transmission member is cylindrical. An inner diameter of the mating cavity in the first direction is equal to a diameter of the first transmission member. An inner diameter of the mating cavity in the second direction is equal to a sum of a diameter of a path of the rotation of the first transmission member about the first rotation axis and the diameter of the first transmission member.

In one of the embodiments, the water pumping device further includes a driving member fixedly connected to the mounting base. The driving member is in transmission connection with the first transmission member and configured to drive the first transmission member to rotate about the first rotation axis.

In one of the embodiments, the water pumping device further includes a third transmission member in transmission connection with the first transmission member. The third transmission member is fixedly connected to a driving end of the driving member so as to rotate about a second rotation axis parallel to the first rotation axis driven by the driving member.

In one of the embodiments, the water pumping device further includes a pump cylinder disposed on the mounting base. The piston is disposed in the pump cylinder in a reciprocally movable manner in the first direction.

A water flosser includes the water pumping device for the water flosser as described above.

The above and other features of the present disclosure including various novel details of construction and combinations of parts, and other advantages, will now be more particularly described with reference to the accompanying drawings and pointed out in the claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DETAILED DESCRIPTION OF THE EMBODIMENTS

In order to make the objects, features and advantages of the present disclosure more obvious and understandable, specific embodiments of the present disclosure will be described in detail below with reference to the accompanying drawings. In the following description, many specific details are set forth in order to fully understand the present disclosure. However, the present disclosure can be implemented in many other ways different from those described herein, and those skilled in the art can make similar improvements without departing from the connotation of the present disclosure. Therefore, the present disclosure is not limited by the specific embodiments disclosed below.

In the description of the present disclosure, it should be understood that orientation or positional relationship indicated by terms "center", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial", "circumferential", and the like are based on orientation or positional relationship shown in the drawings, and are only for the convenience of describing the present disclosure and simplifying the description, rather than indicating or implying that the described device or element must have a specific orientation, be configured and operated in a specific orientation, therefore, these cannot be understood as a limitation of the present disclosure.

In addition, terms "first" and "second" are only used for descriptive purposes, and cannot be understood as indicating or implying relative importance or implicitly indicating the number of the described technical features. Therefore, the features defined with "first" and "second" may explicitly or implicitly include at least one of the features. In the description of the present disclosure, "a plurality of" means at least two, such as two, or three, unless otherwise specifically defined.

In the present disclosure, unless otherwise clearly specified and limited, terms "mounted", "connecting", "connected", "fixed" and the like should be understood in a broad sense. For example, it may be a fixed connection or a detachable connection, or integrated. It may be mechanically connected or electrically connected. It may be directly connected or indirectly connected through an intermediary. It may be the internal communication of two components or the interaction relationship between two components, unless otherwise clearly specified. For those of ordinary skill in the art, the specific meaning of the above-mentioned terms in the present disclosure can be understood according to specific circumstances.

In the present disclosure, unless otherwise clearly specified and defined, a first feature being "on" or "under" a second feature may be that the first feature is in direct contact with the second feature, or that the first feature is in indirect contact with the second through an intermediary. Moreover, a first feature being "above", "upper" and "top of" a second feature may be that the first feature is directly above or obliquely above the second feature, or may simply mean that the level of the first feature is higher than the second feature. A first feature being "below", "under" and "beneath" a second feature may be that the first feature is directly below or obliquely below the second feature, or may simply mean that the level of the first feature is less than the second feature.

It should be noted that when an element is referred to as being "fixed to" or "disposed on" another element, it may be directly on another element or there also may be an intermediate element. When an element is considered to be "connected" to another element, it can be directly connected to another element or there may be an intermediate element at the same time. Terms "vertical", "horizontal", "upper", "lower", "left", "right" and the like used herein are for illustrative purposes only and do not mean the only implementation.

In order to facilitate the understanding of the technical solution of the present disclosure, problems existing in a water pumping device of a conventional water flosser will be described herein. The conventional water flosser is generally connected to one end of a connecting rod through a cam to drive the connecting rod to swing in a sector shape. The other end of the connecting rod is connected to a piston. The piston is driven to move linearly during the swing of the connecting rod in the sector shape, and the pump cylinder can be pressurized during the reciprocation of the piston.

The connecting rod and the piston are connected by a spherical structure, so that the connecting rod can swing in the sector shape with respect to the piston. The processing precision and matching precision of the spherical structure are required to be higher, which results in higher manufacturing costs. In addition, there is an assembly clearance between the connecting rod and the cam and between the connecting rod and the piston, and the connecting rod generates a larger collision noise during the swing in the sector shape. Moreover, the connecting rod and the piston are connected by the spherical structure, in the case of long-term use, the clearance between the connecting rod and the piston is increased due to the friction between the connecting rod and the piston, which not only leads to increased noise, but also may separate the connecting rod from the piston. The water pumping device may be damaged.

In order to solve the above-mentioned problems, the present disclosure provides a water pumping device for a water flosser and a water flosser, which can effectively reduce manufacturing costs and the collision noise, and avoid the damage of the water pumping device.

Figure 1:
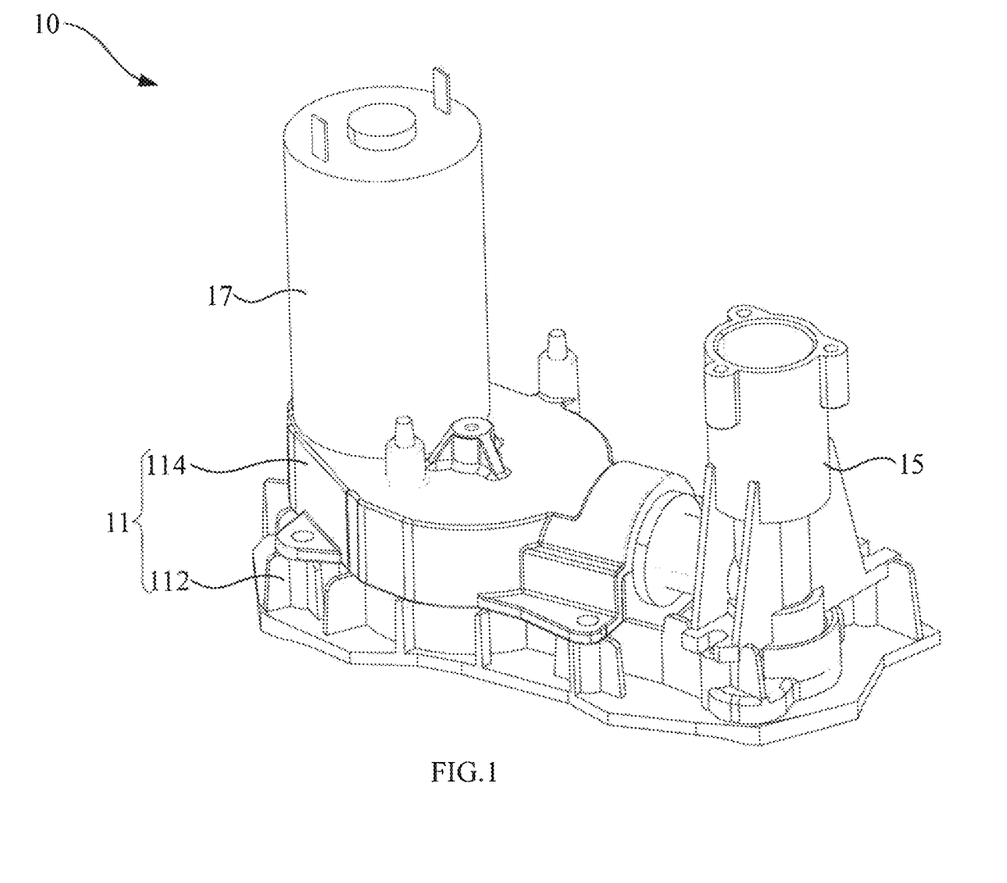
FIG. 1 is a schematic view of a water pumping device for a water flosser according to an embodiment of the preset disclosure.
Figure 2:
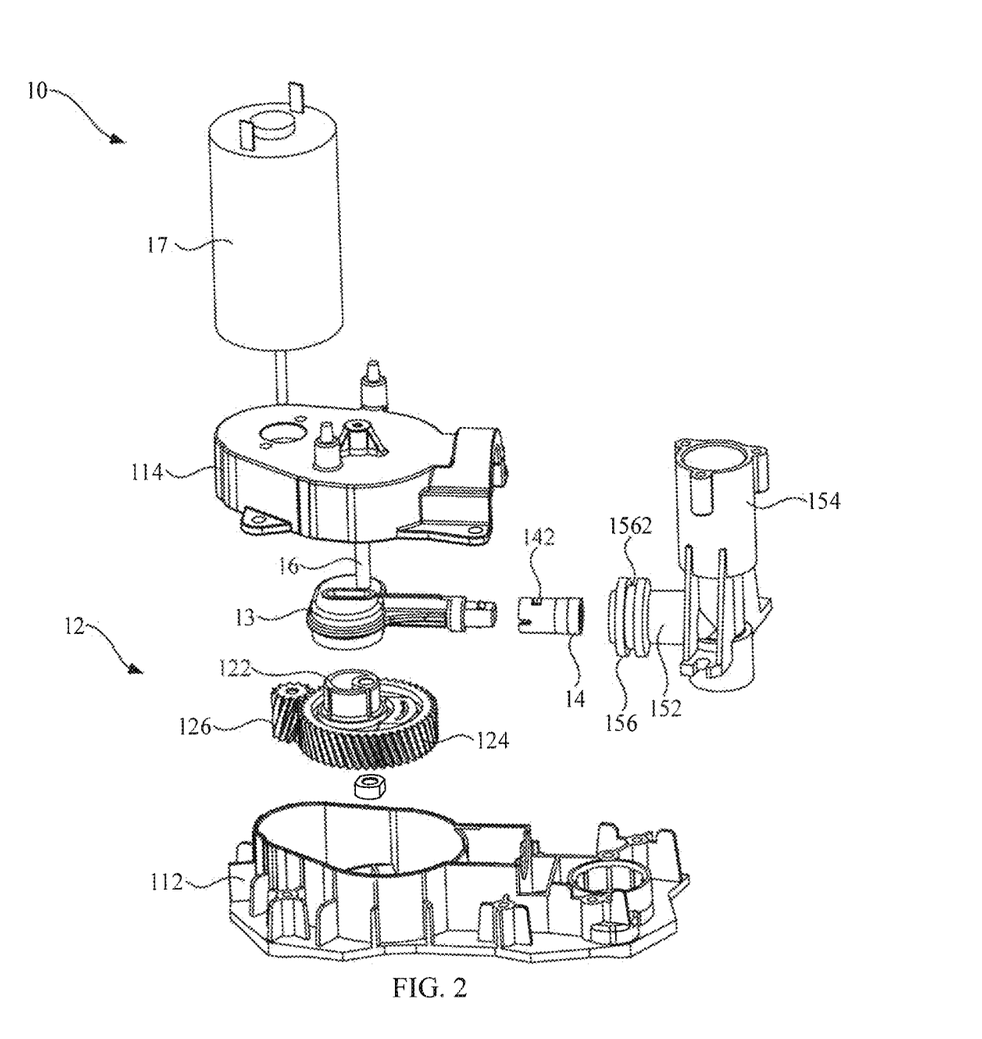
FIG. 2 is an exploded view of the water pumping device shown in FIG. 1.

As shown in FIGS. 1 and 2, a water pumping device 10 for a water flosser according to an embodiment of the present disclosure includes a mounting base 11, a transmission assembly 12, a connecting member 13, and a piston 14.

The transmission assembly 12 includes a first transmission member 122 rotatably connected to the mounting base 11 about a first rotation axis. The first transmission member 122 is eccentrically disposed with respect to the first rotation axis.

The connecting member 13 is disposed in the mounting base 11 in a reciprocally movable manner in a first direction perpendicular to the first rotation axis. The first transmission member 122 is in mating connection with the connecting member 13 to drive the connecting member 13 to reciprocate in the first direction during the rotation about the first rotation axis.

The piston 14 is detachably connected to the connecting member 13 to reciprocate in the first direction with the connecting member 13.

Figure 3:
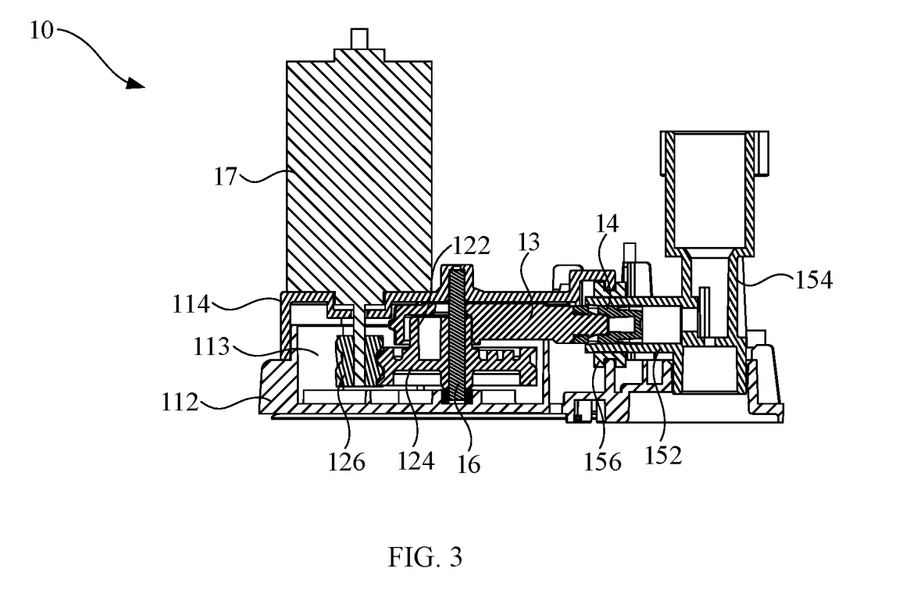
FIG. 3 is a cross-sectional view of the water pumping device shown in FIG. 1 in a viewing angle.

The first rotation axis extends in an up-down direction shown in FIG. 3. The first direction is a left-right direction shown in FIG. 3.

By providing the above-mentioned water pumping device 10, the connecting member 13 is disposed in the mounting base 11 in a manner that the connecting member 13 can reciprocate in the first direction. The first transmission member 122 is rotatable about the first rotation axis perpendicular to the first direction, and is in mating connection with the connecting member 13. The first rotation axis is eccentrically disposed with respect to the first transmission member 122. Therefore, the first transmission member 122 reciprocates in the first direction during the rotation of the first transmission member 122 about the first rotation axis, thereby driving the connecting member 13 to reciprocate in the first direction. The connecting member 13 reciprocates in the first direction, so as to drive the piston 14 to reciprocate in the first direction. In this way, compared to that the conventional connecting rod swings to drive the piston 14 to reciprocate, the connecting member 13 only reciprocates in the first direction and does not swing, and thus the collision noise can be effectively reduced. Moreover, the connecting member 13 does not swing, such that it is ensured that the connecting member 13 only needs to receive the power in the first direction from the first transmission member 122, and the resistance when the connecting member 13 is started is smaller.

Moreover, both the connecting member 13 and the piston 14 reciprocate in the first direction, so that there is no relative movement between the connecting member 13 and the piston 14. In other words, there is no friction between the connecting member 13 and the piston 14. During the long-term use, the clearance between the connecting member 13 and the piston 14 will not increase due to the friction therebetween, thereby avoiding the risk of the separation of the connecting member 13 from the piston 14.

Referring to FIGS. 2 and 3, in some embodiments, the mounting base 11 includes a base body 112 and a cover body 114. The base body 112 is detachably connected to cover body 114 to enclose a mounting cavity 113 The first transmission member 122 and the connecting member 13 are both disposed in the mounting cavity 113.

In some embodiments, the water pumping device 10 further includes a pump cylinder 15. The pump cylinder 15 is disposed on the mounting base 11. The piston 14 is disposed in the pump cylinder 15 in a reciprocally movable manner in the first direction. Furthermore, the pump cylinder 15 is disposed on the base body 112, and an end of the pump cylinder 15 extends into the mounting cavity 113. The piston 14 is disposed, in a reciprocally movable manner in the first direction, at the end of the pump cylinder 15 extending into the mounting cavity 113.

In some embodiments, the pump cylinder 15 includes a pressurizing portion 152 and a pumping portion 154 that are fixedly connected to each other and in communication with each other. An end of the pressurizing portion 152 away from the pumping portion 154 extends into the mounting cavity 113. The piston 14 is disposed in the pressurizing portion 152 in a reciprocally movable manner, and used for pressurizing liquid inside the pressurizing portion 152 and the pumping portion 154 during the reciprocation. The pumping portion 154 is used for conveying the liquid.

Furthermore, the pump cylinder 15 further includes a fixing portion 156 having a fixing groove 1562. When the cover body 114 is connected to the base body 112, the cover body 114 and the base body 112 are engaged in the fixing groove 1562, so that the fixing portion 156 is fixed with respect to the base body 112 and the cover body 114, thereby fixing the pump cylinder 15 with respect to the base body 112.

In practical applications, the cover body 114 is connected to the base body 112, and thus a connecting opening in communication with the mounting cavity 113 is also formed by the cover body 114 being connected to the base body 112. That is, the cover body 114 includes a first notch, the base body 112 includes a second notch, and the cover body 114 is connected to the base body 112, and thus the first notch and the second notch enclose the connecting opening. The first notch of the cover body 114 and the second notch of the base body 112 are limited in the fixing groove 1562, so as to achieve the fixing of the fixing portion 156.

In some embodiments, the connecting member 13 includes a limiting groove 131 extending longitudinally in the first direction. The water pumping device 10 further includes a limiting shaft 16 fixedly connected to the mounting base 11 and extending in a direction parallel to the first rotation axis. The limiting shaft 16 extends through the limiting groove 131 so that the connecting member 13 reciprocates in the first direction.

It should be explained that the limiting shaft 16 extends through the limiting groove 131, so that the connecting member 13 reciprocates in the first direction. Therefore, a width of the limiting groove 131 matches with a diameter of the limiting shaft 16, so as to ensure that after the limiting shaft 16 extends through the limiting groove 131, the connecting member 13 is limited to only reciprocate in the first direction. A length of the limiting groove 131 is at least greater than a distance that the piston 14 needs to reciprocate in the first direction.

Figure 4:
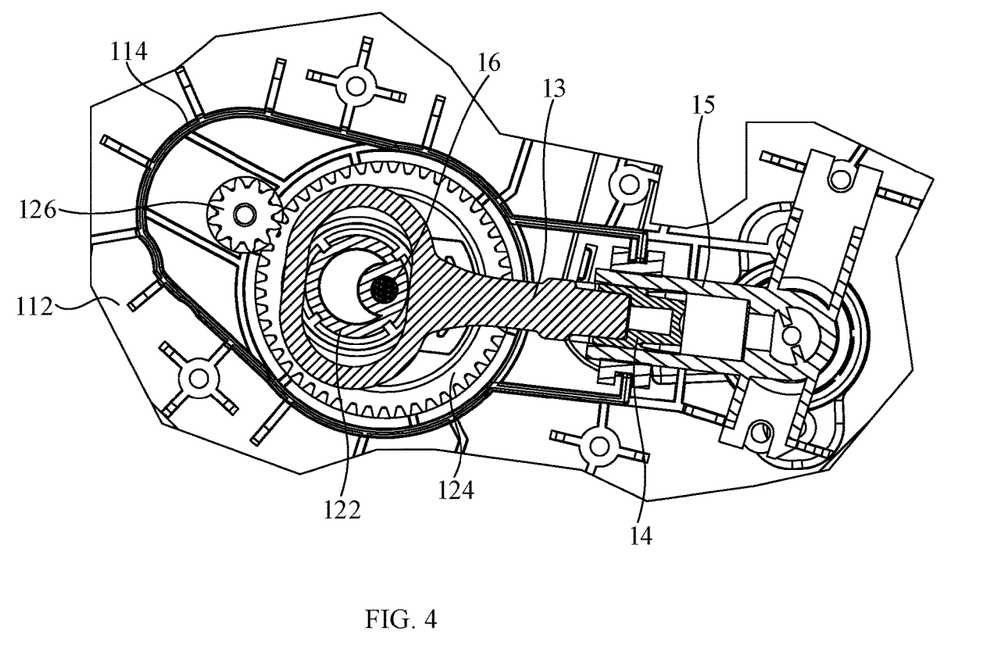
FIG. 4 is a cross-sectional view of the water pumping device shown in FIG. 1 in another viewing angle.

Referring to FIGS. 2 and 4, in some embodiments, the transmission assembly 12 further includes a second transmission member 124. The second transmission member 124 is rotatably disposed in the mounting base 11 about the first rotation axis. The first transmission member 122 is fixedly connected to the second transmission member 124 so as to be rotatable about the first rotation axis with the second transmission member 124.

In practical applications, a central axis of the second transmission member 124 coincides with the first rotation axis, and the first transmission member 122 is eccentrically disposed with respect to the second transmission member 124. That is, the second transmission member 124 rotates about the first rotation axis, and the first transmission member 122 is eccentrically disposed with respect to the second transmission member 124 such that the first transmission member 122 rotates about the first rotation axis as a whole.

It should be noted that there are two situations in which the first transmission member 122 eccentrically rotates about the first rotation axis as a whole, one of which is that the first transmission member 122 is offset from the first rotation axis, that is, revolves about the first rotation axis, and the other of which is that the first rotation axis extends through the first transmission member 122, but is eccentrically disposed with respect to the central axis of the first transmission member 122. In this embodiment, the latter situation is selected to reduce space occupation and improve space utilization.

In some embodiments, a central axis of the limiting shaft 16 coincides with the first rotation axis, and the second transmission member 124 is rotatably connected to the limiting shaft 16 about the first rotation axis. In this way, the limiting shaft 16 not only cooperates with the limiting groove 131 to limit the swing of the connecting member 13 to ensure that the connecting member 13 reciprocates in the first direction, but is also used to connect the second transmission member 124 so that the second transmission member 124 is rotatable about the first rotation axis.

It can be understood that, in this embodiment, the limiting shaft 16 extends through the limiting groove 131. The second transmission member 124 is rotatably connected to the limiting shaft 16. The first transmission member 122 fixedly connected to the second transmission member 124 is in mating connection with the connecting member 13. Therefore, the second transmission member 124, the first transmission member 122, and the connecting member 13 are sequentially arranged in a direction parallel to the first rotation axis.

In addition, the second transmission member 124 is connected to the limiting shaft 16 and can rotate on its axis. That is, the limiting shaft 16 extends through the second transmission member 124. Moreover, the limiting shaft 16 extends through the limiting groove 131, and the limiting shaft 16 is fixedly connected to the mounting base 11. Therefore, the second transmission member 124 includes a through hole through which the limiting shaft 16 extends. During the reciprocation of the connecting member 13, the through hole and the limiting groove 131 always correspond to each other in a direction parallel to the first rotation axis.

In some other embodiments, the water pumping device 10 further includes a rotating shaft. The rotating shaft is fixedly connected to the mounting base 11 and is spaced apart from the limiting shaft 16 in the first direction. The rotating shaft is parallel to the limiting shaft 16. A central axis of the rotating shaft coincides with the first rotation axis.

It should be explained that, in this embodiment, the limiting shaft 16 only serves to limit the swing of the connecting member 13 so that the connecting member 13 reciprocates in the first direction. The second transmission member 124 is rotatably connected to the rotating shaft, and still rotates on its axis.

It should be noted that, in combination with the above embodiment, the first transmission member 122, the second transmission member 124, and the connecting member 13 are all located in the mounting cavity 113. When only the limiting shaft 16 is provided, the base body 112 and the cover body 114 are both provided with a structure for fixing the limiting shaft 16. That is, two opposite ends of the limiting shaft 16 are fixed by the structure on the base body 112 and the cover body 114. When the rotating shaft and the limiting shaft 16 are provided parallel to each other, the base body 112 and the cover body 114 are both provided with two groups of structures for fixing the rotating shaft and the limiting shaft 16 thereon. The two opposite ends of the rotating shaft and limiting shaft 16 are fixed by the corresponding structures.

In some embodiments, the first transmission member 122 cannot move with respect to the connecting member 13 in the first direction. The first transmission member 122 is reciprocally movable with respect to the connecting member 13 in a second direction perpendicular to the first rotation axis and the first direction. The second direction is a front-rear direction shown in FIG. 3.

Taking the first direction as an X-axis direction and the second direction as a Y-axis direction to establish a coordinate system. The first rotation axis extends through an origin point, a path of the first transmission member 122 about the first rotation axis is a circle with a center at the origin point. It can be understood that the rotation of the first transmission member 122 about the first rotation axis can be regarded as a combination of displacements of the first transmission member 122 on the X-axis and the Y-axis. That is, since the first transmission member 122 is eccentrically disposed with respect to the first rotation axis, the first transmission member 122 has displacements in both the first direction and the second direction during the rotation thereof.

The first transmission member 122 cannot move with respect to the connecting member 13 in the first direction, and is reciprocally movable with respect to the connecting member 13 in the second direction, and thus the displacement of the first transmission member 122 in the first direction can be converted into a displacement of the connecting member 13 in the first direction. That is, the connecting member 13 is driven to reciprocate in the first direction. Moreover, the displacement of the first transmission member 122 in the second direction cannot be converted into the displacement of the connecting member 13 in the second direction. That is, the connecting member 13 is not driven to reciprocate in the second direction, and the connecting member 13 cannot swing.

Figure 5:
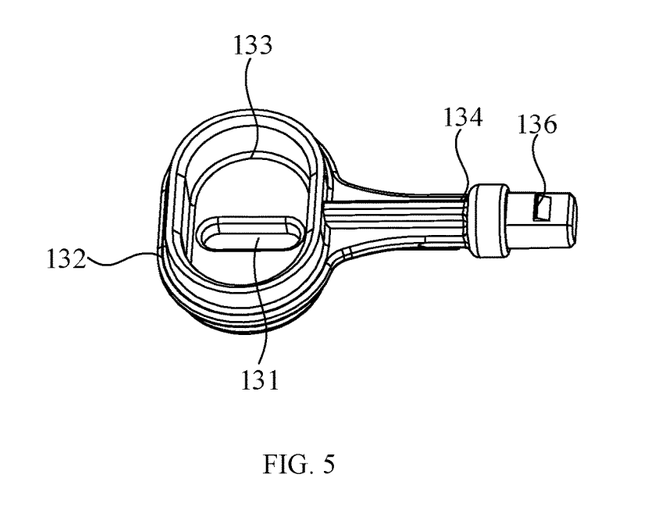
FIG. 5 is a schematic view of a connecting member of the water pumping device shown in FIG. 1.

Referring to FIGS. 4 and 5, in some embodiments, the connecting member 13 includes a mating cavity 133. The first transmission member 122 is located in the mating cavity 133. The first transmission member 122 is cylindrical. An inner diameter of the mating cavity 133 in the first direction is equal to a diameter of the first transmission member 122, so that the first transmission member 122 cannot movable with respect to the connecting member 13 in the first direction.

In other words, since the inner diameter of the mating cavity 133 in the first direction is equal to the diameter of the first transmission member 122, during the rotation of the first transmission member 122 about the first rotation axis, the first transmission member 122 rotates with respect to the connecting member 13 in the mating cavity 133, but the first transmission member 122 can drive the connecting member 13 to reciprocate in the first direction.

Furthermore, an inner diameter of the mating cavity 133 in the second direction is equal to a sum of a diameter of a path of the rotation of the first transmission member 122 about the first rotation axis and the diameter of the first transmission member 122.

In this way, during the rotation of the first transmission member 122 about the first rotation axis, the first transmission member 122 can reciprocate in the second direction with respect to the connecting member 13 in the mating cavity 133, thereby preventing the first transmission member 122 from driving the connecting member 13 to swing in the second direction.

It is understandable that the inner diameter of the mating cavity 133 in the second direction may be greater than the sum of the diameter of the path of the rotation of the first transmission member 122 about the first rotation axis and the diameter of the first transmission member 122, as long as the first transmission member 122 reciprocates in the second direction with respect to the connecting member 13 in the mating cavity 133 during the rotation of the first transmission member 122 about the first rotation axis.

In addition, when only the limiting shaft 16 is disposed and the first rotation axis extends through the first transmission member 122, the limiting shaft 16 also extends through the mating cavity 133. The limiting groove 131 may be partially in communication with the mating cavity 133, or as shown in this embodiment, the limiting groove 131 is formed on a bottom wall of the mating cavity 133.

In other embodiments, when the first transmission member 122 has other shapes, the first transmission member 122 may also drive the connecting member 13 to reciprocate in the first direction when rotating about the first rotation axis. However, since a cross-sectional shape of the first transmission member 122 is not circular, when the first transmission member 122 rotates in a certain section, the length of the first transmission member 122 in the first direction is less than the inner diameter of the mating cavity 133 in the first direction. In this case, the first transmission member 122 can reciprocate in the first direction with respect to the connecting member 13 in the mating cavity 133, and the rotation of the first transmission member 122 in this section may not drive the connecting member 13 to reciprocate in the first direction.

Therefore, it is preferable that the first transmission member 122 has a cylindrical shape, that is, has a circular cross-section, to ensure that the first transmission member 122 always drives the connecting member 13 to reciprocate in the first direction during the rotation of the first transmission member 122 about the first rotation axis.

Specifically, a cross-sectional shape of the mating cavity 133 is similar to an annular racetrack. That is, the mating cavity 133 has two semicircular sides and a rectangular middle portion, and a diameter of the semicircle is the same as the diameter of the first transmission member 122.

Figure 6:
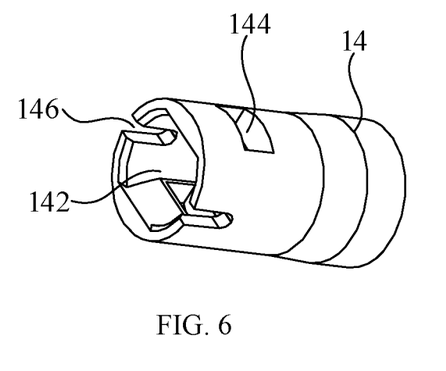
FIG. 6 is a schematic view of a piston of the water pumping device shown in FIG. 1.

Referring to FIGS. 5 and 6, in some embodiments, the connecting member 13 includes a mating portion 132 and a connecting portion 134. The mating portion 132 and the connecting portion 134 are fixedly connected, and are sequentially arranged in the first direction. The mating portion 132 is in mating connection with the first transmission member 122. An end of the connecting portion 134 away from the mating portion 132 is detachably connected to the piston 14.

Furthermore, the mating cavity 133 and the limiting groove 131 in communication with the mating cavity 133 are both formed in the mating portion 132. The end of the connecting portion 134 away from the mating portion 132 is provided with an engaging protrusion 136. The piston 14 is provided with a connecting hole 142 into which the end of the connecting portion 134 away from the mating portion 132 extends, and an engaging hole 144 in communication with the connecting hole 142. The end of the connecting portion 134 away from the mating portion 132 extends into the connecting hole 142, and the engaging protrusion 136 is engaged in the engaging hole 144, so that the end of the connecting portion 134 away from the mating portion 132 is detachably connected to the piston 14, and the piston 14 and the connecting portion 134 are relatively fixed.

In this way, the piston 14 is relatively fixedly connected to the end of the connecting portion 134 away from the mating portion 132. During the reciprocation of the connecting member 13 in the first direction, there is no swing between the piston 14 and the connecting member 134, which further avoids the generation of collision noise, and reduces noise. Moreover, in the case of the long-term use, the connecting portion 134 and the piston 14 also have no risk of being separated due to the increased clearance caused by friction.

In practical applications, the piston 14 further includes two connecting notches 146. The two connecting notches are located at the same end of the piston 14, and both are in communication with the connecting hole 142, so as to divide the end of the piston 14 connected to the connecting portion 134 into two arc-shaped structures. The two arc-shaped structures enable a diameter of the connecting hole 142 of the piston 14 to be variable. When the connecting portion 134 is required to be inserted, the two arc-shaped structures can be pulled apart, and then the connecting portion 134 can extend into the connecting hole 142 until the engaging protrusion 136 is engaged in the engaging hole 144.

Referring to FIGS. 2 and 3, in some embodiments, the water pumping device further includes a driving member 17. The driving member 17 is fixedly connected to the mounting base 11. The driving member 17 is in transmission connection with the first transmission member 122 for driving the first transmission member 122 to rotate about the first rotation axis. Furthermore, the driving member 17 is in transmission connection with the second transmission member 124 to drive the second transmission member 124 to rotate about the first rotation axis, thereby driving the first transmission member 122 to rotate about the first rotation axis.

In some embodiments, the water pumping device 10 further includes a third transmission member 126. The third transmission member 126 is fixedly connected to a driving end of the driving member 17 so as to be driven by the driving member 17 to rotate about a second rotation axis parallel to the first rotation axis. The third transmission member 126 is in transmission connection with the first transmission member 122.

Furthermore, the third transmission member 126 is in transmission connection with the second transmission member 124 to drive the second transmission member 124 to rotate about the first rotation axis, and indirectly drive the first transmission member 122 to rotate about the first rotation axis.

In practical applications, the third transmission member 126 and the second transmission member 124 are gears that are engaged with each other. A radial dimension of the second transmission member 124 is greater than a radial dimension of the third transmission member 126.

In some embodiments, the first transmission member 122 is a roller. The first transmission member 122 is in contact with an inner wall of the mating cavity 133 during the rotation about the first rotation axis. The first transmission member 122 is provided as a roller such that the friction between the first transmission member 122 and the inner wall of the mating cavity 133 can be converted into rolling friction, so as to prevent the friction between the first transmission member 122 and the mating cavity 133 from causing wear to the first transmission member 122 or the mating cavity 133.

It should be explained that, in the above embodiments, the first rotation axis may extend through the first transmission member 122, or may be offset from the first transmission member 122. When the first transmission member 122 is a roller, it is preferable that the first rotation axis is offset from the first transmission member 122.

In addition, in other embodiments, the first transmission member 122 may also be a cylindrical structure fixedly connected to the second transmission member 124, and a side surface of the first transmission member 122 is smoothed to reduce the friction between the first transmission member 122 and the inner wall of the mating cavity 133.

In some embodiments, the driving member 17 is a driving motor. The driving motor is fixed on a side of the cover body 114 away from the base body 112. A driving end of the driving motor extends into the mounting cavity 113 and is fixedly connected to the third transmission member 126 in the mounting cavity 113.

Based on the water pumping device used for the water flosser in the above embodiments, the present disclosure also provides a water flosser, which includes the above water pumping device.

The water pumping device 10 for the water flosser and the water flosser according to the present disclosure have at least the following advantages:

1) The connecting member 13 cannot swing, so that the generation of the collision noise is avoided, thereby reducing the noise of the whole water pumping device.
2) The connecting member 13 is engaged with the piston 14. During the reciprocation of the connecting member 13 in the first direction, there is no swing between the piston 14 and the connecting member 13, which further avoids the generation of collision noise. Moreover, in the case of the long-term use, the connecting portion 134 and the piston 14 also have no risk of being separated due to the increased clearance caused by friction, thereby improving the reliability.

The technical features of the aforementioned embodiments can be combined arbitrarily. In order to simply the description, all possible combinations of the technical features in the aforementioned embodiments are not described. However, as long as there is no contradiction in the combinations of these technical features, they should be considered to be fallen into the range described in the present specification.

Only several implementations of the present disclosure are illustrated in the aforementioned embodiments, and the description thereof is relatively specific and detailed, but it should not be understood as a limitation on the scope of the present disclosure. It should be noted that for those of ordinary skill in the art, without departing from the concept of the present disclosure, several modifications and improvements can be made, which all fall within the protection scope of the present disclosure. Therefore, the protection scope of the present disclosure shall be subject to the appended claims.

What is claimed is:

1. A water pumping device for a water flosser, comprising:
   a mounting base;
   a transmission assembly comprising a first transmission member rotatably connected to the mounting base about a first rotation axis, the first transmission member being eccentrically disposed with respect to the first rotation axis;
   a connecting member disposed in the mounting base in a reciprocally movable manner in a first direction perpendicular to the first rotation axis, and in mating connection with the first transmission member to drive the connecting member to reciprocate in the first direction during a rotation of the first transmission member about the first rotation axis; and
   a piston detachably connected to the connecting member to reciprocate in the first direction with the connecting member;
   wherein the connecting member comprises a limiting groove extending longitudinally in the first direction;
   wherein the water pumping device further comprises a limiting shaft fixedly connected to the mounting base and longitudinally extending in a direction parallel to the first rotation axis, and the limiting shaft extends through the limiting groove such that the connecting member reciprocates in the first direction;
   wherein a central axis of the limiting shaft coincides with the first rotation axis.

2. The water pumping device according to claim 1, wherein the transmission assembly further comprises a second transmission member, the second transmission member being rotatably disposed in the mounting base about the first rotation axis, the first transmission member being fixedly connected to the second transmission member.

3. The water pumping device according to claim 2, wherein the second transmission member is rotatably connected to the limiting shaft about the first rotation axis.

4. The water pumping device according to claim 1, wherein the first transmission member is immovable with respect to the connecting member in the first direction, the first transmission member is capable of reciprocating with respect to the connecting member in a second direction perpendicular to the first rotation axis and the first direction.

5. The water pumping device according to claim 2, wherein the connecting member comprises a mating cavity, the first transmission member is located in the mating cavity, the first transmission member is cylindrical, an inner diameter of the mating cavity in the first direction is equal to a diameter of the first transmission member, an inner diameter of the mating cavity in the second direction is equal to a sum of a diameter of a path of the rotation of the first transmission member about the first rotation axis and the diameter of the first transmission member.

6. The water pumping device according to claim 1, further comprising a driving member fixedly connected to the mounting base, the driving member being in transmission connection with the first transmission member and configured to drive the first transmission member to rotate about the first rotation axis.

7. The water pumping device according to claim 6, further comprising a third transmission member in transmission connection with the first transmission member, and the third transmission member being fixedly connected to a driving end of the driving member so as to rotate about a second rotation axis parallel to the first rotation axis driven by the driving member.

8. The water pumping device according to claim 1, further comprising a pump cylinder disposed on the mounting base, the piston is disposed in the pump cylinder in a reciprocally movable manner in the first direction.

9. A water flosser, comprising the water pumping device for the water flosser of claim 1.

\* \* \* \* \*